(12) United States Patent
De Paoli et al.

(10) Patent No.: US 6,305,066 B1
(45) Date of Patent: Oct. 23, 2001

(54) SUPPORT ELEMENT FOR A WIPER BLADE FORMING PART OF A WIPER SQUEEGEE FOR MOTOR VEHICLE WINDSCREEN AND METHOD FOR MAKING SAME

(75) Inventors: Albano De Paoli, Muehlacker; Bernhard Just, Kernen; Wilfried Merkel, Kappelrodeck; Thomas Schmidt, Baden--Baden; Thomas Kotlarski, Buehlertal; Rolf Bald, Bad Wimpfen; Juergen Reiss, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,307

(22) PCT Filed: Jul. 23, 1998

(86) PCT No.: PCT/DE98/02069

§ 371 Date: Jul. 16, 1999

§ 102(e) Date: Jul. 16, 1999

(87) PCT Pub. No.: WO99/11495

PCT Pub. Date: Mar. 11, 1999

(30) Foreign Application Priority Data

Sep. 2, 1997 (DE) .............................................. 197 38 232

(51) Int. Cl.$^7$ ................................. B60S 1/38; B60S 1/40
(52) U.S. Cl. ..................... 29/450; 15/250.43; 15/250.32; 264/108
(58) Field of Search .......................... 15/250.001, 250.43, 15/250.44, 250.361, 250.32; 264/108; 425/542; 29/897.2, 450

(56) References Cited

U.S. PATENT DOCUMENTS

| 3,820,188 | * | 6/1974 | Moorhead et al. ................ 15/250.44 |
| 3,837,033 | * | 9/1974 | Van der Berg et al. ........... 15/250.32 |
| 3,925,844 | * | 12/1975 | Cone ................................... 15/250.44 |
| 4,014,061 | * | 3/1977 | Jurowski et al. .................. 15/250.43 |
| 4,790,992 | * | 12/1988 | Nishikawa ............................ 425/542 |

FOREIGN PATENT DOCUMENTS

| 0 498 802 B1 | | 12/1993 | (EP) . |
| 2 191 510 | | 2/1974 | (FR) . |
| 2482540 | * | 11/1981 | (FR) ................................. 15/250.43 |

* cited by examiner

Primary Examiner—Gary K. Graham
(74) Attorney, Agent, or Firm—Michael J. Striker

(57) ABSTRACT

A support element for a wiper strip belonging to a wiper blade for motor vehicle windows is proposed, which assures proper contact of a wiper strip, belonging to the wiper blade, with the window to be wiped. The support element is embodied as elongated in bandlike fashion, and it comprises an elastic plastic. The rubber-elastic wiper strip, elongated in bandlike fashion, can be secured to the support element longitudinally axially parallel. An especially durably operationally reliable support element is obtained if the support element is made from a fiber-reinforced thermoplastic plastic, and the fibers are admixed with the plastic.

1 Claim, 2 Drawing Sheets

SUPPORT ELEMENT FOR A WIPER BLADE FORMING PART OF A WIPER SQUEEGEE FOR MOTOR VEHICLE WINDSCREEN AND METHOD FOR MAKING SAME

BACKGROUND OF THE INVENTION

Prior Art

Support elements of the type under consideration are intended to assure the most uniform possible distribution of the contact pressure, originating in a wiper arm joined to the support element, to the window of a motor vehicle. By means of a suitable curvature of the unstressed support element—that is, when the wiper blade has lifted from the window—the ends of the wiper strip, pressed all the way against the window in operation of the wiper blade, are urged toward the window by the then-tensed support element, even if the radii of curvature of spherically curved vehicle windows vary in each wiper blade position. The curvature of the support element and thus of the wiper blade must accordingly be somewhat greater than the greatest curvature measured in the swept field of the window to be wiped. Thus the support element replaces the complicated support bracket construction of the kind used in conventional wiper blades, with two spring rails disposed in the wiper strip.

A known support element of this type (French Patent FR 21 91 510) is made from a plastic material, such as a polypropylene. However, it has been found that the strength and thus the elasticity of such support elements meet the demands made of them for only a short time, because the aging process that ensues makes the material brittle and causes it to creep. Especially the more markedly curved regions of the window can then no longer be cleaned, or can be cleaned only inadequately.

SUMMARY OF THE INVENTION

In the support element of the invention, the fibers admixed with and embedded in the plastic assure high, durably constant strength and elasticity of the plastic. At the same time, its thermal stability is also improved.

It has proved to be especially favorable if glass fibers or other fibers are admixed with the plastic.

Taking into account the work steps for preparing the plastic that precede the unmolding operation, it has proved to be especially favorable if the fibers have a length between 100µ and 20 mm.

If the fibers have a length between 200µ and 600µ, especially unproblematic filling of the molding tool is possible, and the advantageous properties sought for the plastic material still come fully into play.

To further improve the thermal stability and reduce creepage, it is advantageous if the fiber-reinforced plastic is enriched with at least one mineral filler.

An especially economical design of the support element and thus of the wiper blade is obtained by providing that a connection device for the free end of the wiper arm is integrally formed onto the support element. A time-tested connection device for the wiper arm has two stubs, placed in the center portion of the support element and spaced apart from one another parallel to its length, which are connected to one another via a connection peg oriented crosswise to the length of the support element.

To produce a known support element, the molding tool is often—for example, for the sake of a rapid work sequence— provided with a plurality of injection openings, through which it is simultaneously filled with the plastic material. However, this causes so-called "seam formations", where the material, arriving from the various openings, converges. At this "seam", the support element, which in the wiping operation—because of the varying radii of the window—is subjected to uninterruptedly varying changes in shape, is weakened, and in the final analysis this can lead to damage of the support element and thus to a reduction in the wiping quality.

To avoid such "seam formations" and the attendant deficiencies, to produce a plastic support element, the still moldable plastic is introduced via a single opening, discharging into the mold and located in the middle region of the support element to be produced, and from there is forced out to the ends of the support element.

If furthermore fibers of defined length are admixed with the plastic material used for the purpose, the fibers become at least predominantly aligned in the flow direction of the material, and as a result optimal utilization of the fibers in the sense desired is achieved. This advantageous longitudinal alignment of the fibers is attained because, given the extremely slender geometry of the support element, this element practically comprises a pronounced fume layer, which has a very low flow speed, while the layers located beneath it flow substantially faster, and as a result the fibers undergo the aforementioned alignment in the polymer matrix.

It is true that from European Patent Disclosure EP 0 498 802 B1 a support element is known that is produced using fiber material. In it, however, the fibers are processed into strips which after being impregnated in a resin using a core strip are placed in a mold and then compacted. This way of producing support elements is complicated and thus expensive.

In a support element which has two stubs, placed in the center portion of the support element and spaced apart from one another parallel to its length, which are connected to one another via a connection peg oriented crosswise to the length of the support element, especially high strength of the connection peg, which is under high stress during wiping operation, is attained while preserving the aforementioned advantages if the plastic is introduced into a closed mold via a fill opening, characterized in that the fiber-reinforced plastic material is introduced into the mold in the axial direction of the connection peg of the support element to be produced, so that the fiber-reinforced plastic material is forced from there out via the stubs to the ends of the support element. The fibers located in the connection peg, as the mold is being filled, become aligned in the axial direction of the connection peg because of the aforementioned fume layer and the attendant shear flow, so that a substantial reinforcement of the connection peg and its transitions to the stubs is achieved.

Further advantageous refinements and embodiments of the invention are disclosed in the ensuing description of an exemplary embodiment, shown in the drawing, of the support element and of a production method for the support element.

DESCRIPTION OF THE PREFERRED EMBODIMENT

Figure 1:
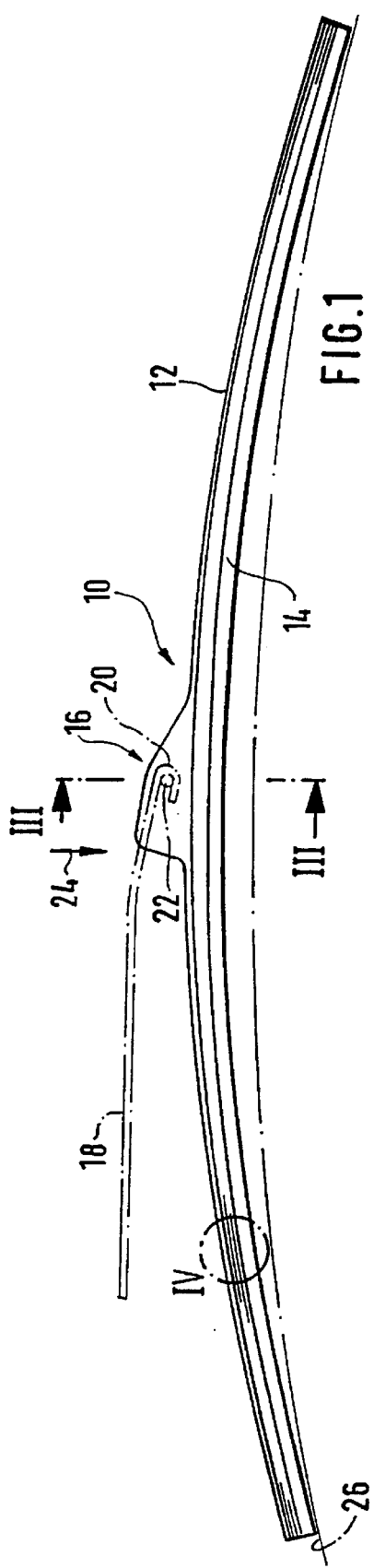
FIG. 1 shows a side view of a wiper blade with a support element of the invention.
Figure 2:
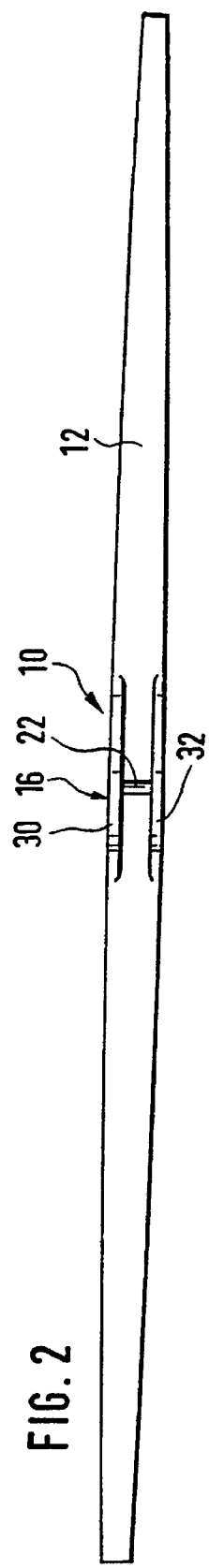
FIG. 2 is a plan view on the wiper blade of FIG. 1.

A wiper blade 10 shown in FIGS. 1 and 2 has an elongated, bandlike support element 12, to whose underside an elongated, rubber-elastic wiper strip 14 is secured longitudinally axially parallel to it. On the top side of the support element, which is made of thermoplastic plastic, is disposed a connection device 16, with whose aid the wiper blade 10 can be detachably connected to a driven wiper arm 18. The wiper arm 18 is guided by one end, not shown, on the body of a motor vehicle. A hook acting as a counterpart connection means is formed onto the free end 20 of the wiper arm 18 and grasps a pivot pin 22 that belongs to the connection device 22 of the wiper blade. The securing between the wiper arm 18 and the wiper blade 10 is taken on by securing means not shown in further detail but known per se and embodied as adapters. The wiper arm 18 and thus also the hook on the end 20 of the arm is urged in the direction of the arrow 24 toward the window to be wiped, whose surface to be wiped is suggested in FIG. 1 by a dot-dash line 26. Since the dot-dash line 26 is meant to represent the greatest curvature of the window surfaces, it is quite apparent that the curvature of the wiper blade, which rests with its two ends on the window, is greater than the maximum curvature of the window. Under the contact pressure (arrow 24), the wiper blade presses with its wiper lip 28 over its entire length against the window surface 26. This causes a tension to build up in the spring-elastic support element 12, and this tension assures a proper contact of the wiper strip 14 or wiper lip 28, over the entire length of the wiper strip.

The support element 12 embodied according to the invention has two cheek-like stubs 30 and 32 in its middle portion, which are disposed, spaced apart from one another, parallel to the length of the support element 12. The pivot pin 22 is disposed between the two stubs 32 and spaced apart from the actual support element 12, as seen particularly in FIG. 3. In the exemplary embodiment shown, the end 20 of the wiper arm 18 engages between the two stubs 30 and 32, and the hooklike end of the wiper arm reaches around the pivot pin 22 (FIG. 1). The support element 12, made of a thermoplastic plastic, is made together with the two stubs and the pivot pin 22 in a single operation in a casting or injection mold. For durably assuring the aforementioned requisite properties of the support element, fibers are admixed with the plastic. These can for instance be glass fibers, carbon fibers, or paramite fibers. In certain cases, the use of polyamide fibers or polyester fibers may even suffice. To enable the plastic composition enriched with the fibers to be readily processable still, it has proved to be favorable if the fiber length is no greater than 20 mm. In a use of fibers whose length is below 100 µm, the permanent elasticity of the support element that is sought and necessary is no longer achieved. Experiments have shown that if fibers with a length between 200µ and 600µ are used, unproblematic processing of the plastic composition is possible, and the requisite criteria for support element elasticity and long-term strength are attained. To improve the thermal stability, at least one mineral filler can also be admixed with the fiber-reinforced plastic. Chalks, talcum, silicates and so forth are especially suitable, for example.

Figure 3:
FIG. 3 shows the sectional area of a section through the support element and the connection device of a wiper blade of FIG. 1, taken along the line III—III and on a larger scale.

As seen particularly in FIG. 3, the wiper strip 14 (shown in dot-dashed lines there) is disposed on the lower side, toward the window to be wiped, of the bandlike support element 12. The joining or fastening of the wiper strip 14 to the support element 12 can for instance be achieved by retaining claws, of the kind disclosed in French Patent 21 91 510. However, it is also conceivable for the wiper strip to be glued to the underside of the support element 12 or secured in some other way.

Figure 4:
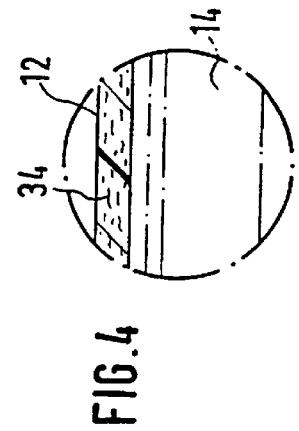
FIG. 4 shows a detail, marked IV in FIG. 1, of the support element in section and on a larger scale.

The detail shown in FIG. 4 of the support element of FIG. 1 shows the support element in a highly enlarged fragmentary section, in which the fibers 34 embedded in the plastic and their alignment in the support element are shown.

Figure 5:
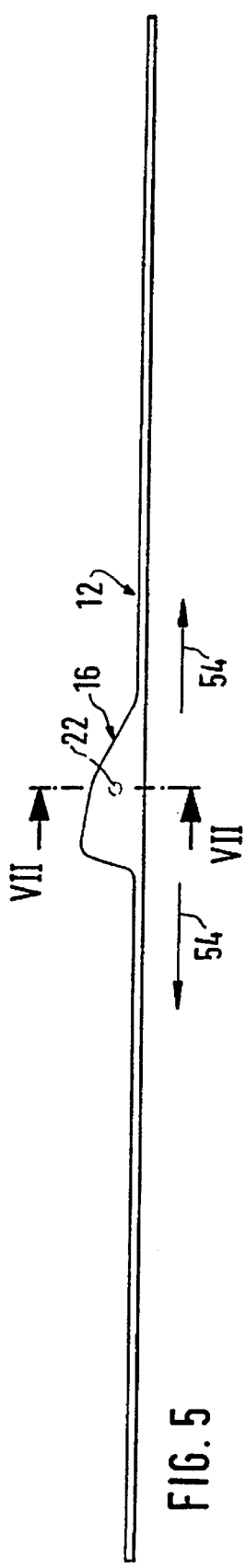
FIG. 5 shows the support element of the wiper blade of FIG. 1 in stretched-out form.
Figure 6:
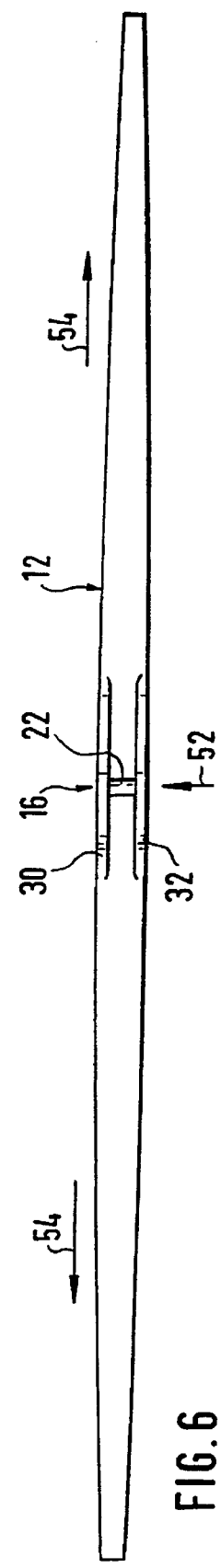
FIG. 6 is a plan view on the support element of FIG. 5.
Figure 7:
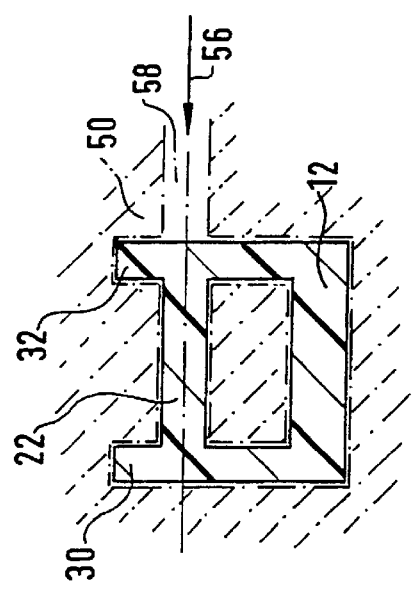
FIG. 7 shows the sectional view of FIG. 3 on a larger scale and disposed in a molding tool.

The support element 12 shown in FIGS. 5 and 6 is shown stretched out, for the sake of simplicity, although—as already noted at the outset—in the unstressed state it must always have the curvature explained in conjunction with FIG. 1. FIG. 7 shows a section taken along the line VII—VII of FIG. 5, which is substantially identical to the sectional view through the support element 12 shown in FIG. 3. The sectional area in FIG. 7 has been enlarged still further over the view in FIG. 3. Dot-dashed lines and a dot-dashed shading also suggest the principle of a pressing or injection mold, which has been shown in the closed state. In the drawing, needs with regard to unmoldability and the disposition of parting seams between the parts of the invention mold have not been shown. FIGS. 5–7 show how the closed injection mold 50 shown is filled with the fiber-reinforced plastic material, so that after the mold 50 is opened, the finished support element can be removed. This takes place in the middle portion of the support element 12 (arrow 52), from which point, the plastic material that has entered the mold there is forced, as indicated by the further arrows 54, toward the ends of the support element, so that after the mold 50 is opened the finished support element can be removed. Filling the injection mold 50 from the middle portion of the support element 12 outward has the advantage that the support element can be produced without the "seam" already mentioned.

If furthermore the support element 12 is provided with a connection device 16 for the wiper arm, which in the exemplary embodiment has two stubs 30 and 32 for the connection peg 22, which in turn are integrally joined to the actual bandlike, elongated support element, it is especially favorable if the fiber-reinforced plastic material is introduced into the mold 50 in the axial direction (arrow 56) of the connection peg 22 of the support element 12 to be produced, so that the fiber-reinforced plastic material is pressed from there outward (arrows 54) to the ends of the support element 12 via the stubs 30, 32. Thus via a fill or injection opening 58, the plastic material enters the closed mold 50 and there initially fills the casting chamber intended for the stubs 32 and then is pressed onward, via the casting chambers for the pivot pin 22 and the support element 12, to the casting chamber for the stub 30. Finally, the fiber-filled plastic material flows in the direction of the arrows 54 into the mold chamber that leads to the ends of the support element 12. Because of the extremely slender geometry of the support element 12, this element comprises a pronounced peripheral layer, in which in the injection operation, because of the resultant shearing, the fibers 34 become aligned at least predominantly in the flow direction (arrows 54), in which they optimize the modulus of elasticity in the primary bending direction of the support element. In the region of the connection device 16, the fibers (because of the crosswise flow direction) are not optimally located with respect to the stress but because of the greater thickness of the stubs 30 and 32 and the thus-higher moment of inertia, the load capacity of the joining region 12 is increased sufficiently. After the mold 50 is opened, the finished support element can be removed from it.

What is claimed is:

1. A method for producing a support element (12) in combination with a wiper strip of a wiper blade (10) of a motor vehicle, the support element being spring-elastic and connectable to a free end of (20) of a driven wiper arm (18) and formed as an elongated band-shaped element which is made from a fiber reinforced thermoplastic plastic material, in which fibers are admixed with a plastic material, and the wiper strip (14) being an elongated band-shaped elastic strip extending longitudinally parallel to the support element (12) and secured directly to a bottom side of the support element, and the support element comprising a connection device (16) for connecting the support element to the free end of the wiper arm, the connecting device being provided on an upper side of the support element, wherein when the wiper blade presses against a window surface to be washed, a tension is built in the spring-elastic support element thereby ensuring a proper contact of the wiper strip (14) with the window surface to be washed wherein the connection device (16) includes two stubs (30, 32) positioned in a center portion of the support element (12) and spaced apart from one another parallel to a length of the support element and are connected to one another via a connection peg (22) extended crosswise to the length of the support element, the method in which the fiber-reinforced plastic material is introduced via a filling opening in to a middle portion of a closed mold (50) in an axial direction of the connection peg (22) of the support element to be produced, so that the fiber-reinforced plastic material is forced from the middle portion out via the stubs (30, 32) to the ends of the support element, and the finished support element can be removed after an opening of the mold, wherein the connection device (16) for connecting the support element to the free end of the wiper arm (18) is integrally formed with the support element (12), wherein the connection device (16) includes two stubs (30, 32) positioned in a center portion of the support element (12).

* * * * *